(12) United States Patent
Li et al.

(10) Patent No.: US 12,521,073 B2
(45) Date of Patent: Jan. 13, 2026

(54) DETERMINATION OF LONGITUDINAL POSITION OF COMBINED PHANTOM

(71) Applicant: Siemens Shanghai Medical Equipment Ltd., Shanghai (CN)

(72) Inventors: Tao Tao Li, Shanghai (CN); Xuan Gu, Shanghai (CN); Yi Tian, Shanghai (CN); Yu Ting Lou, Shanghai (CN)

(73) Assignee: Siemens Shanghai Medical Equipment Ltd., Shanghai (CN)

( * ) Notice: Subject to any disclaimer, the term of this patent is extended or adjusted under 35 U.S.C. 154(b) by 185 days.

(21) Appl. No.: 18/579,951

(22) PCT Filed: Aug. 27, 2021

(86) PCT No.: PCT/CN2021/115082
§ 371 (c)(1),
(2) Date: Jan. 17, 2024

(87) PCT Pub. No.: WO2023/000437
PCT Pub. Date: Jan. 26, 2023

(65) Prior Publication Data
US 2024/0335173 A1 Oct. 10, 2024

(30) Foreign Application Priority Data
Jul. 20, 2021 (CN) .......................... 202110817910.9

(51) Int. Cl.
*A61B 6/58* (2024.01)
*A61B 6/03* (2006.01)

(52) U.S. Cl.
CPC .............. *A61B 6/032* (2013.01); *A61B 6/583* (2013.01)

(58) Field of Classification Search
CPC ................................ A61B 6/032; A61B 6/583
See application file for complete search history.

(56) References Cited

U.S. PATENT DOCUMENTS

| 2005/0002495 A1* | 1/2005 | Hein ...................... A61B 6/583 378/207 |
| 2005/0141672 A1 | 6/2005 | Endo et al. |
| 2012/0076259 A1 | 3/2012 | Holt |

FOREIGN PATENT DOCUMENTS

| CN | 110041559 A | 7/2019 |
| WO | WO 2018081420 A1 | 5/2018 |

OTHER PUBLICATIONS

U.S. Appl. No. 62/414,613, filed Oct. 29, 2017, Reflexion Medical, Inc.

(Continued)

*Primary Examiner* — Courtney D Thomas
(74) *Attorney, Agent, or Firm* — Banner & Witcoff, Ltd.

(57) ABSTRACT

A method for determining a longitudinal position of a combined phantom, a computer readable storage medium, and a CT device. The method includes: scanning the combined phantom to obtain a topogram thereof. The combined phantom is fixed to a table top, protrudes beyond the table top, is axially parallel to the longitudinal direction, and includes a plurality of phantoms, one of which is a slice phantom. The method further includes identifying the plurality of phantoms on the topogram, and using an axial center of the slice phantom as the longitudinal position of the combined phantom. The longitudinal position is determined by using the topogram of the combined phantom, and a phantom position is aligned automatically.

10 Claims, 3 Drawing Sheets

(56) References Cited

OTHER PUBLICATIONS

Apr. 14, 2022 (PCT) International Search Report and Written Opinion—App. PCT/CN2021/115082.

* cited by examiner

DETERMINATION OF LONGITUDINAL POSITION OF COMBINED PHANTOM

TECHNICAL FIELD

The present disclosure relates to a method for determining a longitudinal position of a combined phantom.

BACKGROUND

When a CT manufacturer releases a new software version, all on-site systems will be upgraded to this version. If some changes need tuning, all the affected systems need on-site services, which causes a heavy workload for service engineers. One solution for this is to instruct a customer to place a phantom on a correct holder and automatically align the phantom.

In addition, on a production line, the phantom is automatically aligned in a Y direction but needs to be manually aligned in a Z direction.

SUMMARY

In view of this, the present disclosure provides a method for determining a longitudinal position of a combined phantom, a computer-readable storage medium, and a CT device.

According to a first aspect of the present disclosure, a method of determining a longitudinal position of a combined phantom is provided and includes: scanning the combined phantom to obtain a topogram thereof, the combined phantom being fixed to a table top and protruding beyond the table top, the combined phantom being axially parallel to the longitudinal direction, the combined phantom including a plurality of phantoms and one of which being a slice phantom: identifying the plurality of phantoms on the topogram; and using an axial center of the slice phantom as the longitudinal position of the combined phantom.

In an aspect, the identifying the plurality of phantoms on the topogram includes: for each reading i, calculating a channel quantity $C_i$ greater than an air HU value, $0 \leq i \leq N-1$ and N being a total quantity of readings: smoothing a curve of the channel quantity $C_i$: using a phantom length between a start position of a non-air part greater than a minimum phantom radial size and a radial size change portion as a measured length of a current phantom: and if the measured length of the current phantom is close to a length of the current phantom, identifying the current phantom.

In an aspect, the smoothing of a curve of the channel quantity $C_i$ includes: determining that adjacent readings with close channel quantities belong to the same phantom; and averaging the channel quantities of the same phantom.

In an aspect, the channel quantities being close refers to: $|C_i - C_{i+1}| < T_c$ where $T_c$ is a positive integer threshold.

In an aspect, $T_c = 4$.

In an aspect, the measured length of the current phantom being close to the length of the current phantom refers to: $|L_j - L_{j, default}| < T_L$ where $L_j$ is a measured length of a phantom j, $L_{j,default}$ is a length of the phantom j, and $T_L$ is a positive threshold.

In an aspect, $T_L = 2$ mm.

In an aspect, the longitudinal direction is a direction in which the table top enters and exits a computed tomography device.

According to a second aspect of the present disclosure, a computer-readable storage medium is provided, on which a computer program is stored, and the program is executed by a processor to implement the method as described above.

According to a third aspect of the present disclosure, a computed tomography device is provided and includes a memory, a processor, and a computer program stored in the memory and executed by the processor, the processor implementing the method as described above when executing the program.

According to the method for determining a longitudinal position of a combined phantom, the computer-readable storage medium, and the CT device in the present disclosure, the longitudinal position is determined by using the topogram of the combined phantom, and a phantom position can be quickly and automatically aligned.

BRIEF DESCRIPTION OF THE DRAWINGS

To enable a person of ordinary skill in the art to understand the foregoing and other features and advantages of the present disclosure more clearly, exemplary aspects according to the present disclosure are described in detail below with reference to the accompanying drawings.

In the accompanying drawings.

Figure 1:
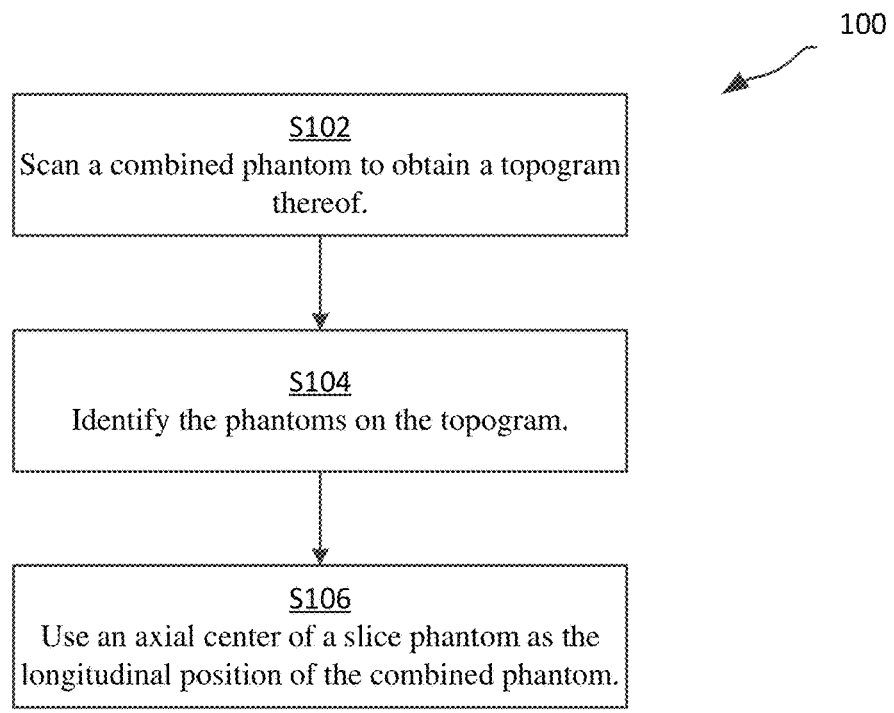
FIG. 1 is a schematic flowchart of a method for determining a longitudinal position of a combined phantom according to an aspect of the present disclosure.

In the accompanying drawings, the reference numerals used are as follows:

| 100 | Method | 108 | Slice phantom |
|---|---|---|---|
| S102, S104, S106, S108, S110, S112, S114, S116, and S118 | Steps | 110 | Water phantom |
| 102 | Combined phantom | 112 | Holder |
| 104 | Focus alignment phantom | 114 | Table top |
| 106 | High-resolution phantom | | |

DETAILED DESCRIPTION

To make the objective, technical solutions, and advantages of the present disclosure clearer, the present disclosure is further described in detail below by using aspects.

Figure 2:
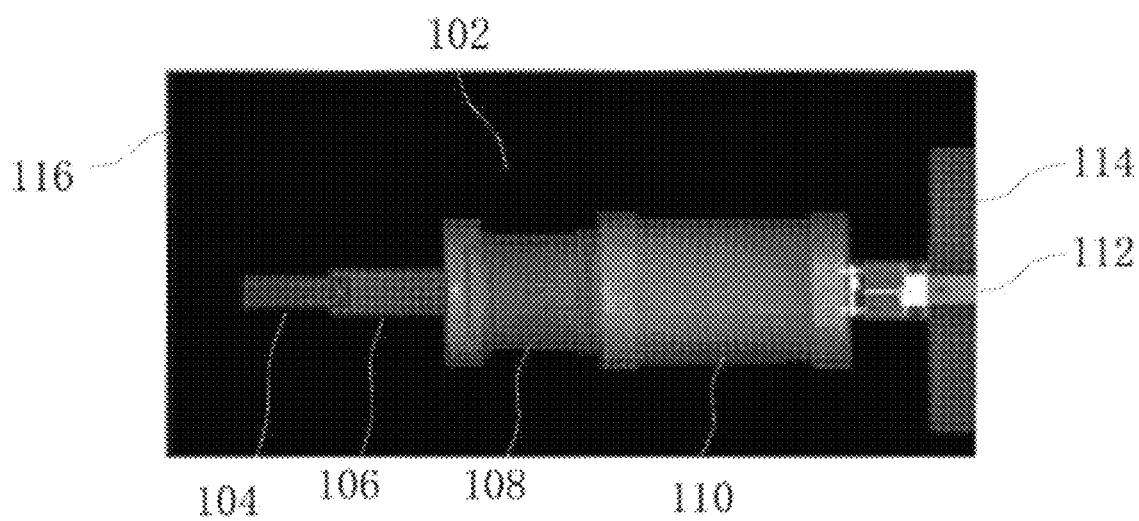
FIG. 2 is a schematic diagram of a topogram according to an aspect of the present disclosure.

FIG. 1 is a schematic flowchart of a method 100 for determining a longitudinal position of a combined phantom according to an aspect of the present disclosure, and FIG. 2 is a schematic diagram of a topogram 116 according to an aspect of the present disclosure. As shown in FIG. 1 and FIG. 2, the method 100 for determining a longitudinal position of a combined phantom includes step S102, step S104, and step S106.

Step S102: Scan a combined phantom 102 to obtain a topogram 116 thereof. The combined phantom 102 is fixed to a table top 114, for example, by using a holder 112, and protrudes beyond the table top 114. Therefore, it can be seen from the topogram 116 that air is around the combined phantom 102. It should be noted that in the present disclosure, the so-called longitudinal direction is a direction in which the table top enters and exits a computed tomography device, that is, a direction Z. The combined phantom 102 is axially parallel to the longitudinal direction and includes a plurality of phantoms, one of which is a slice phantom 108. In this aspect of the present disclosure, the combined phantom 102 includes a focus alignment phantom 104, a high-resolution phantom 106, the slice phantom 108, and a water phantom 110.

Figure 3:
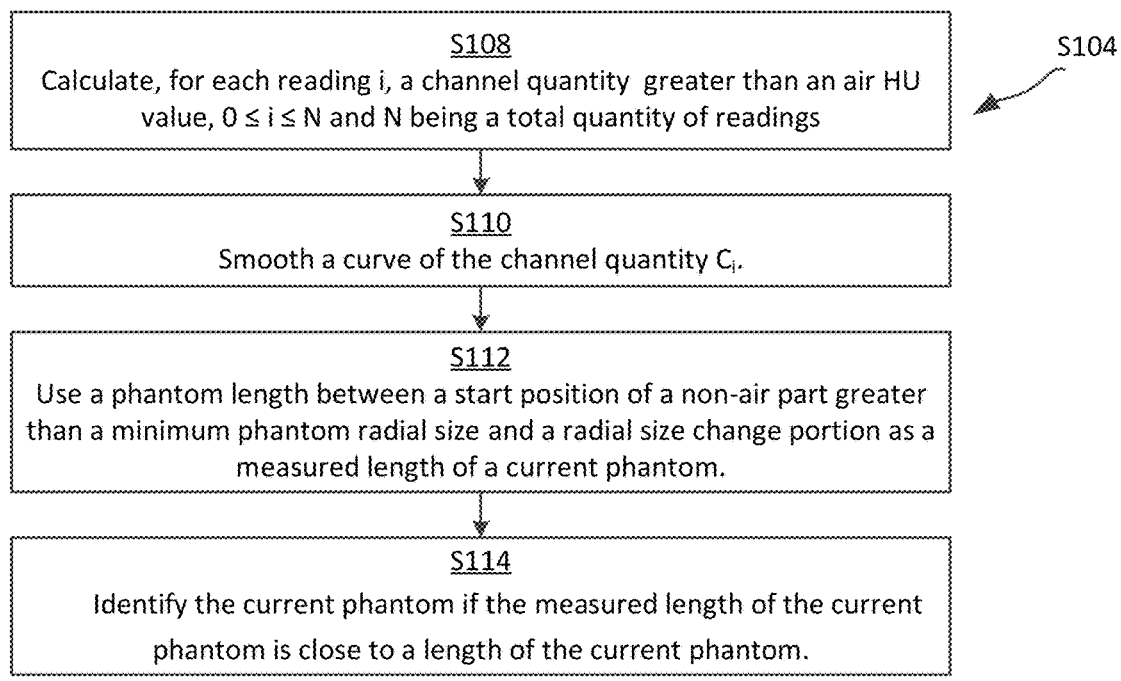
FIG. 3 is a schematic flowchart of identifying a plurality of phantoms on a topogram according to an aspect of the present disclosure.

Step S104: Identify the foregoing phantoms on the topogram 116. FIG. 3 is a schematic flowchart of identifying a plurality of phantoms on a topogram according to an aspect of the present disclosure. As shown in FIG. 3, in this aspect, step S104 may include step S108, step S110, step S112, and step S114.

Figure 4:
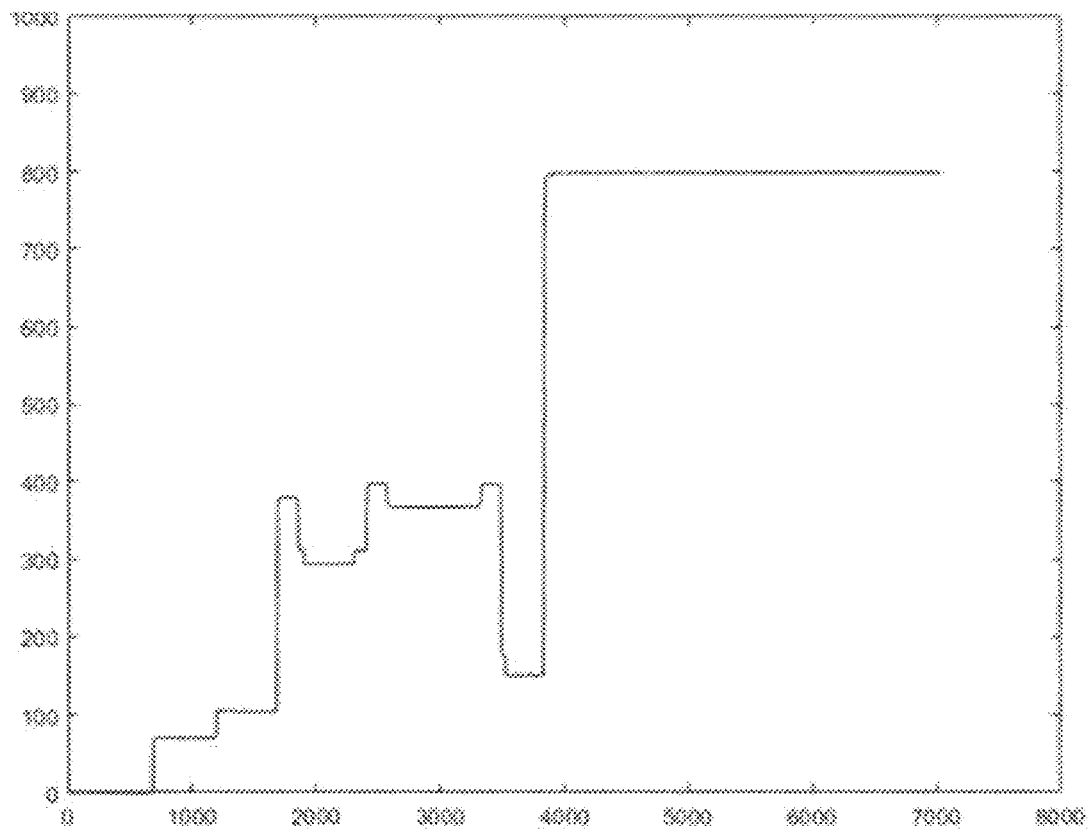
FIG. 4 is a curve of a reading with regard to a channel quantity greater than an air HU value according to an aspect of the present disclosure.

Step S108: Calculate, for each reading i, a channel quantity $C_i$ greater than an air HU value, $0 \leq i \leq N-1$ and N being a total quantity of readings. FIG. 4 is a curve of a reading with regard to a channel quantity $C_i$ greater than an air HU value according to an aspect of the present disclosure.

Step S110: Smooth a curve of the channel quantity $C_i$.

Step S112: Use a phantom length between a start position of a non-air part greater than a minimum phantom radial size and a radial size change portion as a measured length of a current phantom.

Step S114: Identify the current phantom if the measured length of the current phantom is close to a length of the current phantom.

Figure 5:
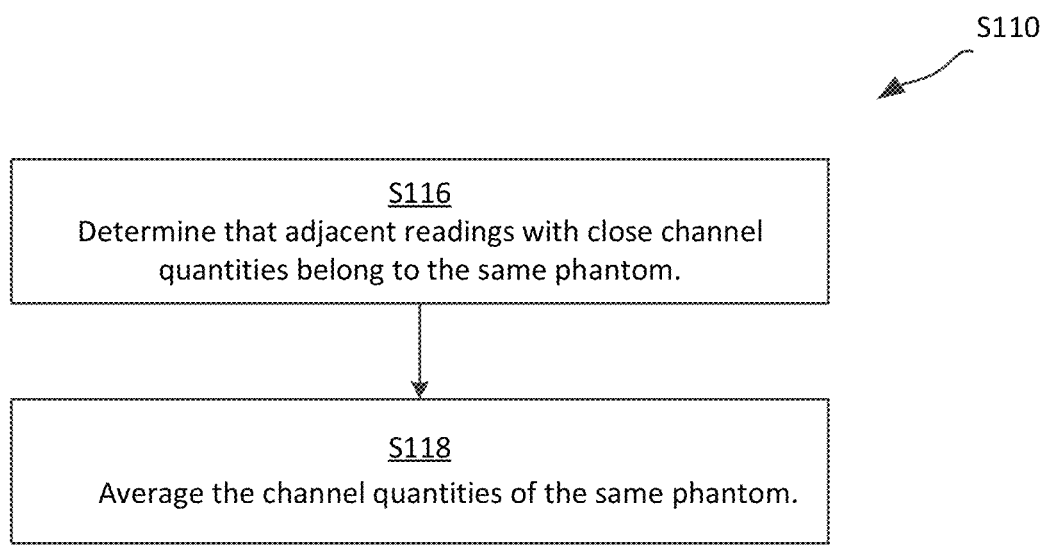
FIG. 5 is a schematic flowchart of smoothing a curve of a channel quantity according to an aspect of the present disclosure.

FIG. 5 is a schematic flowchart of smoothing a curve of a channel quantity $C_i$ according to an aspect of the present disclosure. As shown in FIG. 5, step S110 of smoothing the curve of the channel quantity $C_i$ includes step S116 and step S118.

Step S116: Determine that adjacent readings with close channel quantities belong to the same phantom. The channel quantities being close may be represented as:

$$|C_i - C_{i+1}| < T_C$$

where $T_C$ is a positive integer threshold. In this aspect of the present disclosure, $T_C=4$.

Step S118: Average the channel quantities of the same phantom.

In step S114, the measured length of the current phantom being close to the length of the current phantom refers to:

$$|L_j - L_{j,default}| < T_L$$

where $L_j$ is a measured length of a phantom j, $L_{j,default}$ is a length of the phantom j, and $T_L$ is a positive threshold. In this aspect of the present disclosure, $T_L=2$ mm.

As shown in FIG. 1, after step S104 of identifying the phantom on the topogram 116, in step S106, an axial center of the slice phantom 108 is used as the longitudinal position of the combined phantom 102.

After the longitudinal position of the combined phantom is calculated, a position of another phantom may be checked according to the position and a default distance of each phantom in a configuration table. If all phantoms can cover a longitudinal range of scanning, the longitudinal position of the phantom is confirmed.

According to another aspect of the present disclosure, a computer-readable storage medium is provided, storing a computer program, and the program, when executed by a processor, implements the method 100 for determining a longitudinal position of a combined phantom.

According to still another aspect of the present disclosure, a computed tomography device is provided, including a memory, a processor, and a computer program stored on the memory and executable on the processor, the processor implementing the method 100 for determining a longitudinal position of a combined phantom when executing the program.

According to the method for determining a longitudinal position of a combined phantom, the computer-readable storage medium, and the CT device in the present disclosure, the longitudinal position is determined by using the topogram of the combined phantom, which can quickly and automatically align a phantom position.

The foregoing descriptions are merely preferred aspects of the present disclosure but are not intended to limit the present disclosure. Any modification, equivalent replacement, or improvement made within the spirit and principle of the present disclosure shall fall within the protection scope of the present disclosure.

What is claimed is:

1. A method for determining a longitudinal position of a combined phantom, comprising:
   scanning the combined phantom to obtain a topogram thereof,
   wherein the combined phantom is fixed to a table top, protrudes beyond the table top, is axially parallel to the longitudinal direction, and comprises a plurality of phantoms, one of which is a slice phantom;
   identifying the plurality of phantoms on the topogram; and
   using an axial center of the slice phantom as the longitudinal position of the combined phantom.

2. The method according to claim 1, wherein the identifying the plurality of phantoms on the topogram comprises:
   for each reading i, calculating a channel quantity $C_i$ greater than an air HU value, wherein $0 \leq i \leq N-1$ and N is a total quantity of readings;
   smoothing a curve of the channel quantity $C_i$;
   using a phantom length between a start position of a non-air part greater than a minimum phantom radial size and a radial size change portion as a measured length of a current phantom; and
   if the measured length of the current phantom is close to a length of the current phantom, identifying the current phantom.

3. The method according to claim 2, wherein the smoothing of the curve of the channel quantity $C_i$ comprises:
   determining that adjacent readings with channel quantities that are close belong to a same phantom; and
   averaging the channel quantities of the same phantom.

4. The method according to claim 3, wherein the channel quantities that are close refers to:

$$|C_i - C_{i+1}| < T_C$$

wherein $T_C$ is a positive integer threshold.

5. The method according to claim 4, wherein $T_C=4$.

6. The method according to claim 2, wherein the measured length of the current phantom being close to the length of the current phantom refers to:

$$|L_j - L_{j,default}| < T_L$$

wherein $L_j$ is a measured length of a phantom j, $L_{j,default}$ is a length of the phantom j, and $T_L$ is a positive threshold.

7. The method according to claim 6, wherein $T_L$=2 mm.

8. The method according to claim 1, wherein the longitudinal direction is a direction in which the table top enters and exits a computed tomography device.

9. A non-transitory computer-readable storage medium storing a computer program that, when executed by a processor, causes the processor to implement the method according to claim 1.

10. A computed tomography device, comprising:
   a memory;
   a processor; and
   a computer program stored in the memory and executable by the processor to implement the method according to claim 1.

* * * * *